Jan. 8, 1946. T. H. BRIGGS ET AL 2,392,572
FRICTION CLUTCH
Filed Feb. 18, 1944
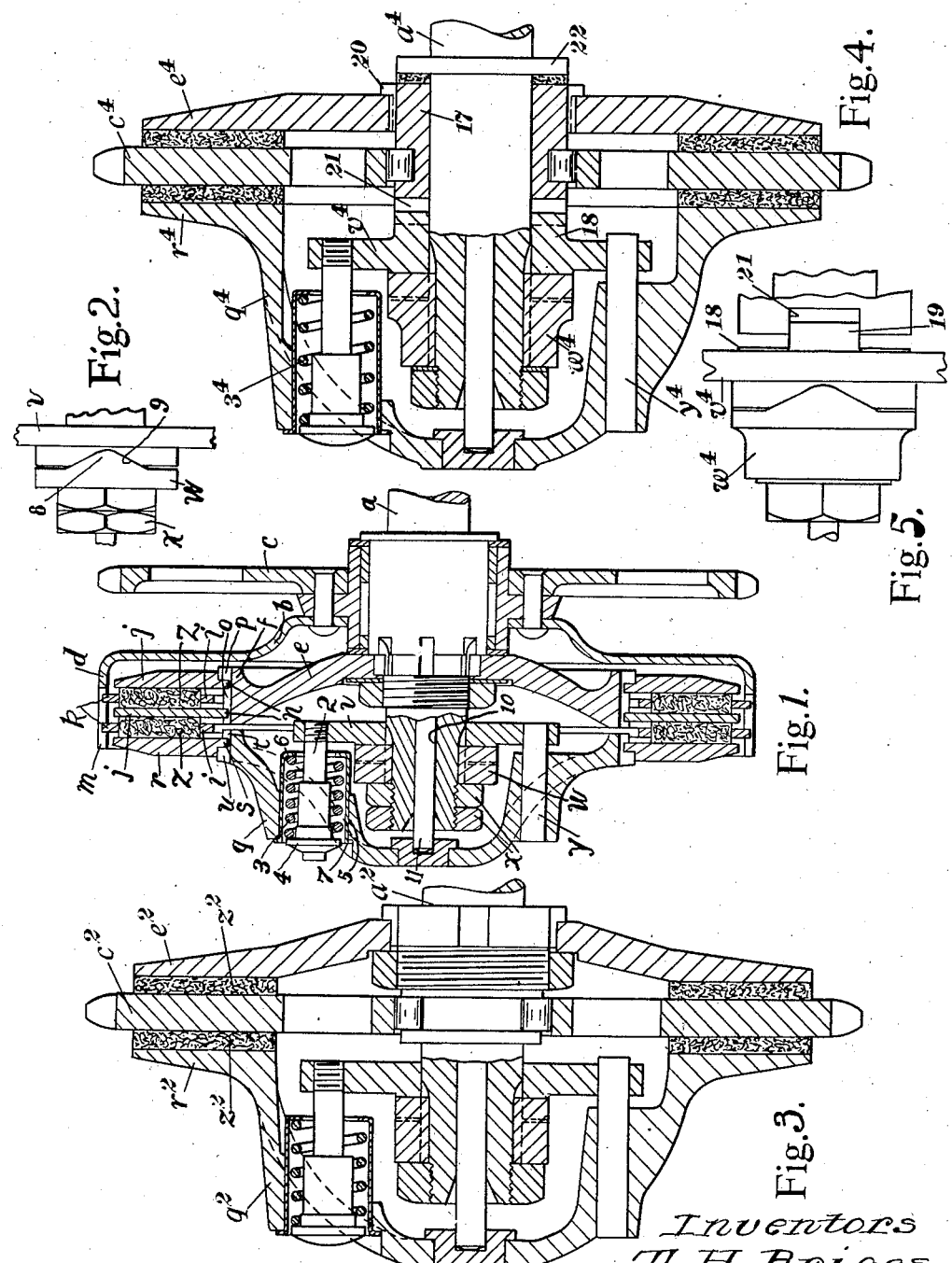

Patented Jan. 8, 1946

2,392,572

UNITED STATES PATENT OFFICE 2,392,572

FRICTION CLUTCH

Thomas Henry Briggs and Walter Henry Briggs, Birmingham, England, assignors to Burman & Sons Limited, Birmingham, England Application February 18, 1944, Serial No. 522,922 In Great Britain March 31, 1943

2 Claims. (Cl. 192—54)

This invention has for its object to provide an improved friction clutch of the multi-plate type, and particularly for use in the transmission mechanisms of motor cycles.

In the accompanying sheet of explanatory drawings:

Figure 1 is a sectional side elevation of a friction clutch constructed in accordance with the invention, and Figure 2 is a plan of a part of the clutch shown in Figure 1.

Figures 3 and 4 are similar views to Figure 1 illustrating respectively two modified forms of the invention, and Figure 5 is a plan of a part of the clutch shown in Figure 4.

In carrying the invention into effect as shown in Figures 1 and 2, we employ a spindle $a$ which serves as the driven (or driving) member. On this spindle is freely mounted a clutch member $b$, and on the latter is secured or formed a driving (or driven) sprocket wheel $c$. The clutch member $b$ is in the form of a plate having extending from one side of it a peripheral flange $d$. Within the space enclosed by the flange $d$ of the clutch member $b$ (hereinafter termed the outer clutch member) is arranged another clutch member $e$ (hereinafter termed the inner clutch member) which is secured to the spindle $a$, and which is formed with a peripheral flange $f$, the latter being separated from the flange on the outer clutch member by an annular space. In this annular space are arranged a plurality of annular friction plates $i$, $j$, the arrangement being such that the plates $i$ alternate with the plates $j$. Outer radial projections as $k$ on the friction plates $i$ engage grooves or slots as $m$ in the flange $d$ of the outer clutch member $b$, and inner radial projections as $n$ on the other friction plates $j$ engage slots or grooves as $o$ in the flange $f$ of the inner clutch member $e$. Also the plate $j$ which is situated nearest to the main portion of the outer clutch member $b$ receives endwise support from a shoulder $p$ on the flange $f$ of the inner clutch member $e$.

At the side of the inner clutch member $e$ remote from the main portion of the outer clutch member $b$ is arranged a pressure plate $q$ which is shaped to accommodate and enclose the adjacent end of the spindle $a$. The periphery of the pressure plate $q$ carries another annular friction plate $r$ having inward radial projections as $s$ engaging grooves as $t$ in the periphery of the pressure plate. This annular plate $r$ receives endwise support from a shoulder $u$ on the periphery of the pressure plate, and is arranged to act on the adjacent side of the friction plate assembly $i$, $j$. Preferably and as shown the friction plates $i$ carry pads as $z$ of any convenient friction material against which the adjacent faces of the friction plates $j$ and $r$ can bear.

On the portion of the spindle $a$ lying between the inner clutch member $e$ and the pressure plate $q$ there is freely mounted a cam plate $v$, and immediately alongside the cam plate there is keyed to the spindle a cam collar $w$ which is supported endwise by a nut or pair of nuts $x$ screwed on to the adjacent end of the spindle. The cam plate $v$ is slidably connected to the pressure plate $q$ by one or more (preferably three) pins as $y$ secured at one end to one of these plates and slidable through a hole or holes in the other. Also the cam plate $v$ is connected to the pressure plate $q$ by a plurality of (preferably three) additional pins as $2$ surrounded by strong helical springs as $3$. Each pin $2$ is secured at one end to the cam plate $v$, and has screwed on its other or outer end an adjustable collar $4$. The springs $3$ on the pins $2$ bear at one end against the corresponding collars $4$ and at the other end against abutments on the pressure plate $q$. Also the springs $3$ are enclosed by tubular housings $5$ having at their inner ends internal flanges $6$ which form the above mentioned abutments for the springs, and having at their outer ends external flanges $7$ which abut against the outer face of the pressure plate $q$, the housings being inserted through holes in the pressure plate, and the pins $2$ being arranged to pass through the inner ends of the corresponding housings.

The adjacent faces of the cam plate $v$ and collar $w$ are interconnected by blunt V-shaped or other teeth as $8$ on the one engaging corresponding recesses as $9$ in the other, the said teeth and recesses being so shaped that relative angular movement between the plate and collar causes the plate to slide on the spindle $a$.

The spindle $a$ is formed with an axial bore $10$, and through the bore passes a slidable thrust rod $11$ operable by the user and adapted at its outer end to exert endwise pressure on the center of the pressure plate $q$.

The mode of action of the clutch above described is as follows:

When the pressure plate $q$ is pushed outward by the rod $11$ against the action of the springs $3$, endwise pressure on the friction plates $r$, $i$, $j$ is relieved and the inner and outer clutch members $e$, $b$ are thereby virtually disconnected from each other. On releasing the pressure exerted by the rod $11$, the action of the springs $3$ causes the pressure plate $q$ to exert endwise pressure through the friction plate $r$ on the friction plates $i, j$ and so enable the latter to effect a driving connection between the outer and inner clutch members $b, e$. So long as the torque transmitted is a light one, the pressure exerted on the friction plates $i, j$ is solely that due to the springs 3, and no relative angular movement occurs between the cam plate $v$ and cam collar $w$. But when the torque exceeds a predetermined amount, the cam plate $v$ moves relatively to the cam collar $w$ and causes the endwise pressure exerted on the friction plates $i, j$ by the springs 3 to be correspondingly increased.

Compensation for wear of the friction pads $z$ is effected by adjusting the screw collar 4 on the stems 2.

Figures 3 to 5 illustrate two modified forms of the invention in which parts similar or analogous to those above described are indicated by the same reference characters suffixed by 2 in Figure 3, and 4 in Figures 4 and 5.

The embodiment shown in Figure 3 is distinguished from that shown in Figure 1 by the form and arrangement of the driving (or driven) sprocket wheel and the friction plates. Thus, the sprocket wheel $c^2$ is freely mounted on the spindle $a^2$ at a position between and adjacent to a plate $r^2$ formed on or secured to the pressure member $q^2$ and a plate $e^2$ secured on the spindle. Also the sprocket wheel $c^2$ and the plates $r^2, e^2$ are adapted to serve as the friction plates of the clutch, thin rings $z^2$ of friction material being arranged between them.

In the embodiment shown in Figures 4 and 5, there is freely mounted on the spindle $a^4$ at the side of the cam plate $v^4$ remote from the cam collar $w^4$ a short sleeve 17, and on this sleeve are mounted the sprocket wheel $c^4$ and the friction plate $e^4$, the sprocket wheel being rotatably supported by the sleeve, and the friction plate being splined to the sleeve and supported endwise by a shoulder 20 on the sleeve. At the side adjacent to the sleeve 17 the cam plate $v^4$ is formed with a central boss 18, and the outer end of this boss is formed with projections 19 which engage complementary recesses 21 in the adjacent end of the sleeve so that the sleeve is angularly movable with but permits independent axial movement of the cam plate, the other end of the sleeve being supported axially by a shoulder 22 on the spindle $a^4$. In other respects the embodiment shown in Figures 4 and 5 is similar to that shown in Figure 3.

When the clutch shown in Figures 4 and 5 is in operation, the action of the springs as $3^4$ causes endwise pressure to be exerted on the friction members formed by the plate $r^4$, the sprocket wheel $c^4$ and the plate $e^4$, and so enables a driving connection to be effected between the sprocket wheel and the spindle $a^4$ through the pressure member $q^4$, the pin or pins $y^4$, the cam plate $v^4$, and the cam collar $w^4$, the pressure on the friction members being increased by relative angular movement of the cam plate and collar if the torque exceeds a predetermined amount. The sleeve 17 serves to prevent relative angular movement of the plates $r^4$ and $e^4$ without affecting the required relative axial movements of these parts.

By our invention we are able to transmit heavier torques than is ordinarily possible with a clutch of a given size, and we enable the desired result to be obtained in a very simple manner. Whilst the invention is primarily intended for use in motor cycle transmission mechanisms it may be applied to other analogous uses. The invention is not, however, limited to the examples above described as subordinate details of construction or arrangement may be varied to suit different requirements.

Having thus described our invention what we claim as new and desire to secure by Letters Patent is:

1. A friction clutch comprising the combination of a pair of rotatable (driving and driven) members one of which has the form of a spindle and is surrounded by the other, a plurality of friction plates adapted to provide a driving connection between the said members, a pressure member movable in one direction for exerting pressure on the friction plates and in the opposite direction for relieving pressure on the plates, a plurality of springs acting on the pressure member in the direction for causing it to exert pressure on the plates, means adapted under the control of the user to act on the pressure member in the direction for causing it to relieve pressure on the plates, and a cam plate freely mounted on the spindle and slidably connected to the pressure member, pins surrounded by the springs and secured to the cam plate, adjustable collars mounted on the pins and serving as abutments for adjacent ends of the springs, tubular housings enclosing the springs and carried by the pressure member, the said housings being provided with abutments for the other ends of the springs, and a cam collar rotatable with and supported against endwise movement on the spindle, the cam plate and collar having interengaging end faces so shaped that relative angular movement between the cam plate and collar causes the cam plate to slide on the spindle and thereby increase the pressure exerted by the springs on the pressure member.

2. A friction clutch as claimed in claim 1, in which the friction plates are formed by the rotatable member to be connected to the spindle, a second plate situated at one side of the said member and connected to the cam plate, and a third plate situated at the other side of the said member and slidably connected to the cam plate.

THOMAS HENRY BRIGGS.
WALTER HENRY BRIGGS.